United States Patent [19]

Kiyoshi

[11] Patent Number: 5,029,150
[45] Date of Patent: Jul. 2, 1991

[54] TRACKING DEVICE FOR OPTICAL MEMORY CARD

[75] Inventor: Horie Kiyoshi, Kanagawa, Japan
[73] Assignee: Kabushiki Kaisha CKS, Tokyo, Japan
[21] Appl. No.: 368,327
[22] PCT Filed: Oct. 6, 1988
[86] PCT No.: PCT/JP88/01021
  § 371 Date: Jun. 22, 1989
  § 102(e) Date: Jun. 22, 1989
[87] PCT Pub. No.: WO89/03577
  PCT Pub. Date: Apr. 20, 1989

[30] Foreign Application Priority Data
  Oct. 7, 1987 [JP] Japan .................. 62-253216

[51] Int. Cl.$^5$ ........................ G11B 7/095
[52] U.S. Cl. .................... 369/44.25; 369/48;
                                235/454; 250/201.5
[58] Field of Search .......... 369/44.25, 44.16, 44.17,
    369/44.32, 121, 106, 44.38, 44.39, 48; 360/70;
                    250/201.1, 201.5, 202, 205; 235/245

[56] References Cited

U.S. PATENT DOCUMENTS

| | | | |
|---|---|---|---|
| 4,611,316 | 9/1986 | Takeuchi et al. | 369/44.25 |
| 4,730,290 | 3/1988 | Takasago et al. | 369/44.25 |
| 4,800,546 | 1/1989 | Shikichi et al. | 369/44 |

Primary Examiner—Robert L. Richardson
Assistant Examiner—Thang V. Tran
Attorney, Agent, or Firm—Lackenbach Siegel Marzullo & Aronson

[57] ABSTRACT

A tracking device performs tracking correction by moving a mobile objective lens of an optical system in the transverse direction of tracks on an optical memory card in accordance with the tracking error of the optical system relative to the optical memory card. The tracking device includes comparison means for determining whether or not tracking error information is within a predetermined standard range and for generating a direction signal that represents the direction for correction, correcting signal generating means for generating a correcting signal when the result of the determination conducted by the comparison means is negative, and retaining portion moving means for moving a retaining portion of the objective lens in the direction indicated by the direction signal in response to the correcting signal delivered from the generating means. When it has been determined by the comparison means that the deviation occurring during tracking is within the predetermined standard range, tracking is performed by moving the mobile objective lens in the transverse direction of the tracks. When the deviation in the tracking is outside the standard range, the retaining portion of the mobile objective lens is also moved in the transverse direction of the tracks to perform tracking correction. In consequence, the range in which tracking correction can be performed is enlarged, and an accuracy with which data is written on and read from the optical memory can be thereby improved.

3 Claims, 6 Drawing Sheets

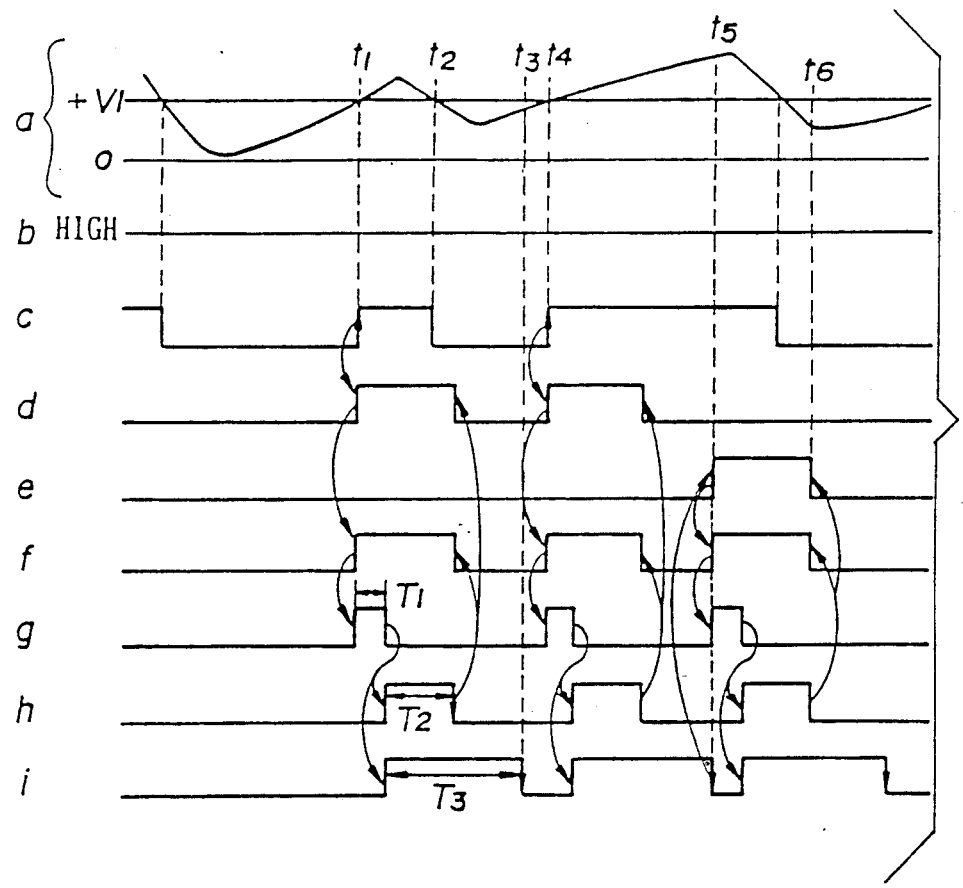
FIG. 5
FIG. 6
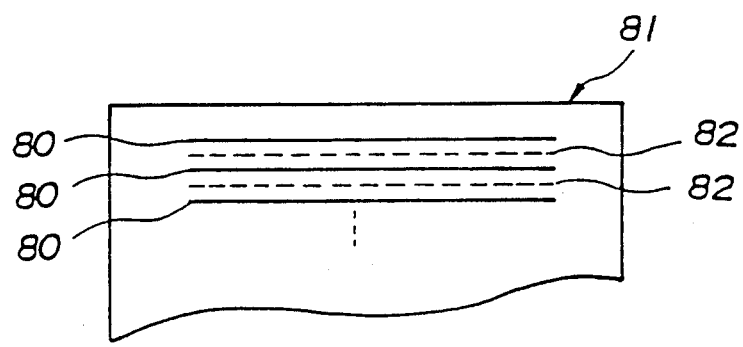

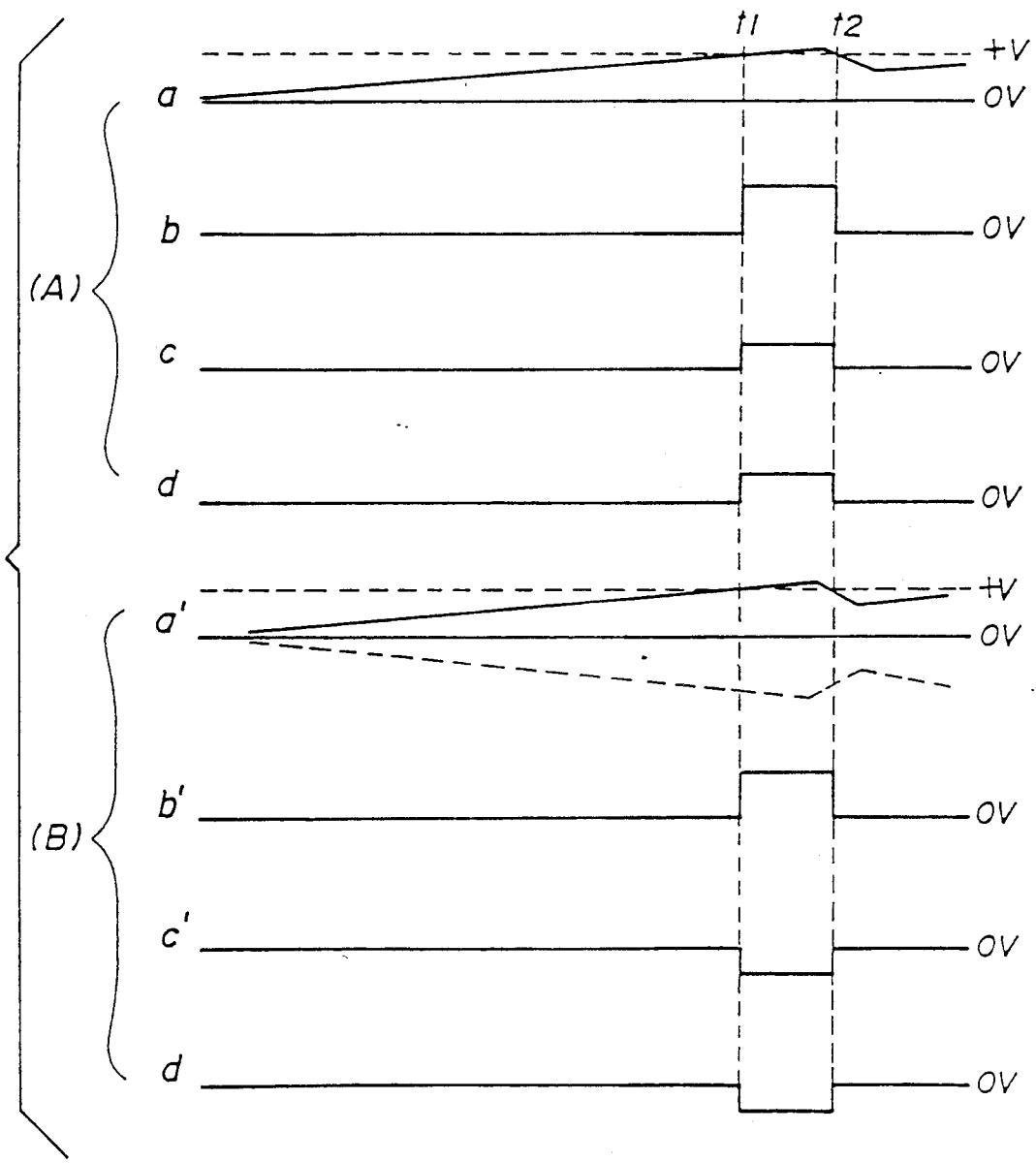

TRACKING DEVICE FOR OPTICAL MEMORY CARD

DESCRIPTION

1. Technical Field

The present invention relates to an optical memory card, and more particularly, to a tracking device for an optical memory card.

2. Background Art

Optical recording media on which digital data is recorded by forming optically changed patterns such as bright and dark pits have recently been attracting considerable attention. Since data can be recorded on such optical recording media at a high density, optical recording media offer the ability to provide large capacity memories. Proposals have therefore been made not only for disk type optical memories but also for card type memories.

In an optical memory card of the above-described type, optically or magneto-optically changed states are formed in a discrete fashion on the surface of the card in correspondence with the data to be recorded, such changed states being read by irradiating an optical beam such as laser beam thereon.

In practice, fine irregularities or a bright and dark pattern may be formed on the surface of the recording medium, i.e., on the surface of the card, and the recorded data is read by utilizing the difference in the reflectivity, the index of refraction or the transmittance of the optical beam irradiated on the fine irregularities or the bright and dark pattern. Alternatively, the thermomagnetically recorded data is read from the recording medium by utilizing variations in polarization caused owing to the magnetooptic effect of the optical beam irradiated on the recording medium.

As shown in FIG. 6, data is generally written on a card 81 on data tracks 82 formed adjacent to and along tracking lines 80 provided in the longitudinal direction of the card 81. Data thus recorded is generally read from or written on any arbitrary data track 82 first by moving a reading or writing optical system in the tranverse direction of the tracks and selecting a target data track and then by moving the card 81 in the direction of the tracks and running a reading or writing beam relative to the card 81 along that data track 82 while making the optical system follow the tracking line corresponding to the target data track.

When the optical system follows tracking lines, an optical image 8 of the associated tracking line is first received by light-receiving elements 7a and 7b, and a signal representing the voltage difference occurring in the outputs of these elements is then taken out from a differential amplifier 9 as a tracking error signal, as shown in FIG. 2. The tracking error signal is a signal proportional to any deviation occurring during tracking. Deviation occurring during tracking is corrected by moving a mobile objective lens of the optical system in the transverse direction of the track in correspondence with this tracking error signal. The mobile objective lens is held on a lens retaining portion provided in the optical system by spring members such as hair springs in such a manner as to be movable in the vertical and horizontal directions. Electromagnetic force is utilized to move the mobile objective lens. Vertical movement of the objective lens is utilized for focusing control, whereas horizontal movement thereof is utilized for the tracking control.

The range in which an objective lens having a diameter of, for example, 3 mm can be moved is limited to, for example, +400 μm, and this makes it impossible for an optical system to cope with any deviation occurring during tracking that exceeds a prescribed level. It is therefore necessary for the skew of the tracking lines relative to the optical system to be restricted to a minimum value. In other words, in the above-described card type optical memory, the tracking lines must be provided parallel to the sides of the card with a high degree of accuracy, and the card must also be supported or moved with a high degree of accuracy.

DISCLOSURE OF INVENTION

An object of the present invention is to provide a tracking device which is suitable for use in an optical memory card and which is capable of coping with a relatively large skew of the card.

To this end, the present invention provides a tracking device for an optical memory card in which tracking correction is performed by moving a mobile objective lens of an optical system in the trasverse direction of a track in accordance with a tracking error of the optical system relative to the optical memory card, as shown in FIG. 1. The tracking device comprises comparison means 2 for determining whether or not tracking error information is within a predetermined standard range and for generating a direction signal that represents the direction for correction, correcting signal generating means 4 for generating a correcting signal when the result of the determination conducted by the comparison means is negative, and retaining portion moving means 6 for moving a retaining portion in the direction indicated by the direction signal in response to the correcting signal output from the generating means. In consequence, the range in which tracking correction can be performed can be enlarged.

The correcting signal generating means 4 generates a pulse as a correcting signal. When the result of the determination remains negative after the pulse has been generated, the correcting signal generating means 4 generates another pulse. The retaining portion moving means 6 includes a tracking motor driven by pulses, and a tracking motor driving circuit for driving the motor in response to the correcting signal and the direction signal.

When the retaining portion of the objective lens is moved, it is preferable for a photodetector to be moved together with the retaining portion.

When the comparison means determines that the deviation occurring during tracking is within the predetermined standard range, tracking is performed by moving the objective lens in the transverse direction of a track. When it has been determined that the deviation occurring during tracking is outside of the standard range, the retaining portion of the mobile objective lens is also moved in the transverse direction of the track so as to perform tracking correction.

The above-described standard range may be set to, for example, a value which corresponds to the maximum movable range of the mobile objective lens. It is to be noted that the standard range may also be set to any value within the maximum movable range of the mobile objective lens. In that case, the range in which tracking mistakes are detected is narrowed, and this allows the damage to the written data to be more reliably prevented. In practice, the standard range may be set to the potential difference required to move an optical beam to an adjacent track. In a case where the retaining portion is of the fixed type as in the conventional tracking device, the objective lens retaining portion is also moved in the direction in which any deviation in the tracking is corrected, and this enables the range in which the tracking correction can be performed to be enlarged when the deviation occurring during tracking exceeds the maximum range in which the objective lens can be moved.

BRIEF DESCRIPTION OF THE DRAWINGS

FIG. 5, consisting of a-i, shows the operation timings of the circuit of FIG. 4;

FIG. 6 is a schematic view of an optical memory card;

FIG. 9, consisting of (A) and (B), illustrates the operation timings of the circuit of FIG. 8.

BEST MODE FOR CARRYING OUT THE INVENTION

Embodiments of the present invention will be described below.

Figure 1:
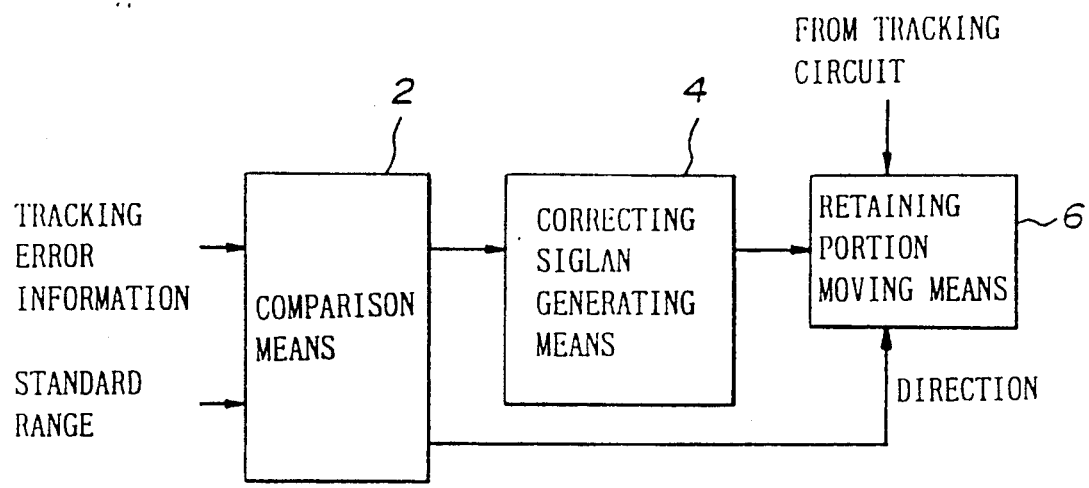
FIG. 1 is a block diagram, illustrating the structure of the present invention.
Figure 2:
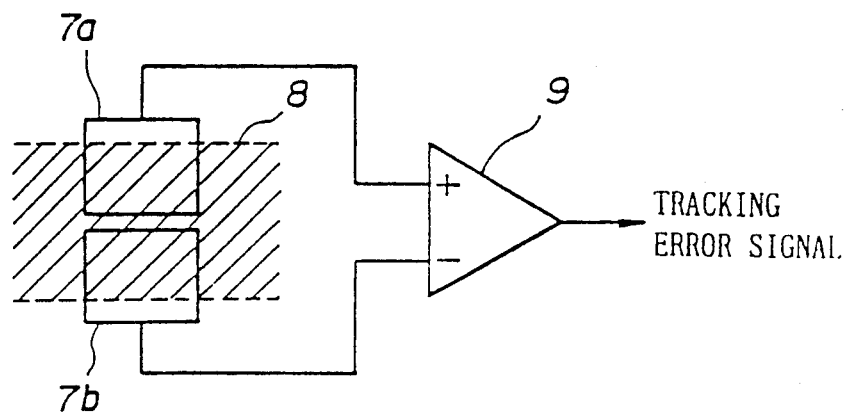
FIG. 2 illustrates how a tracking error signal is generated.
Figure 3:
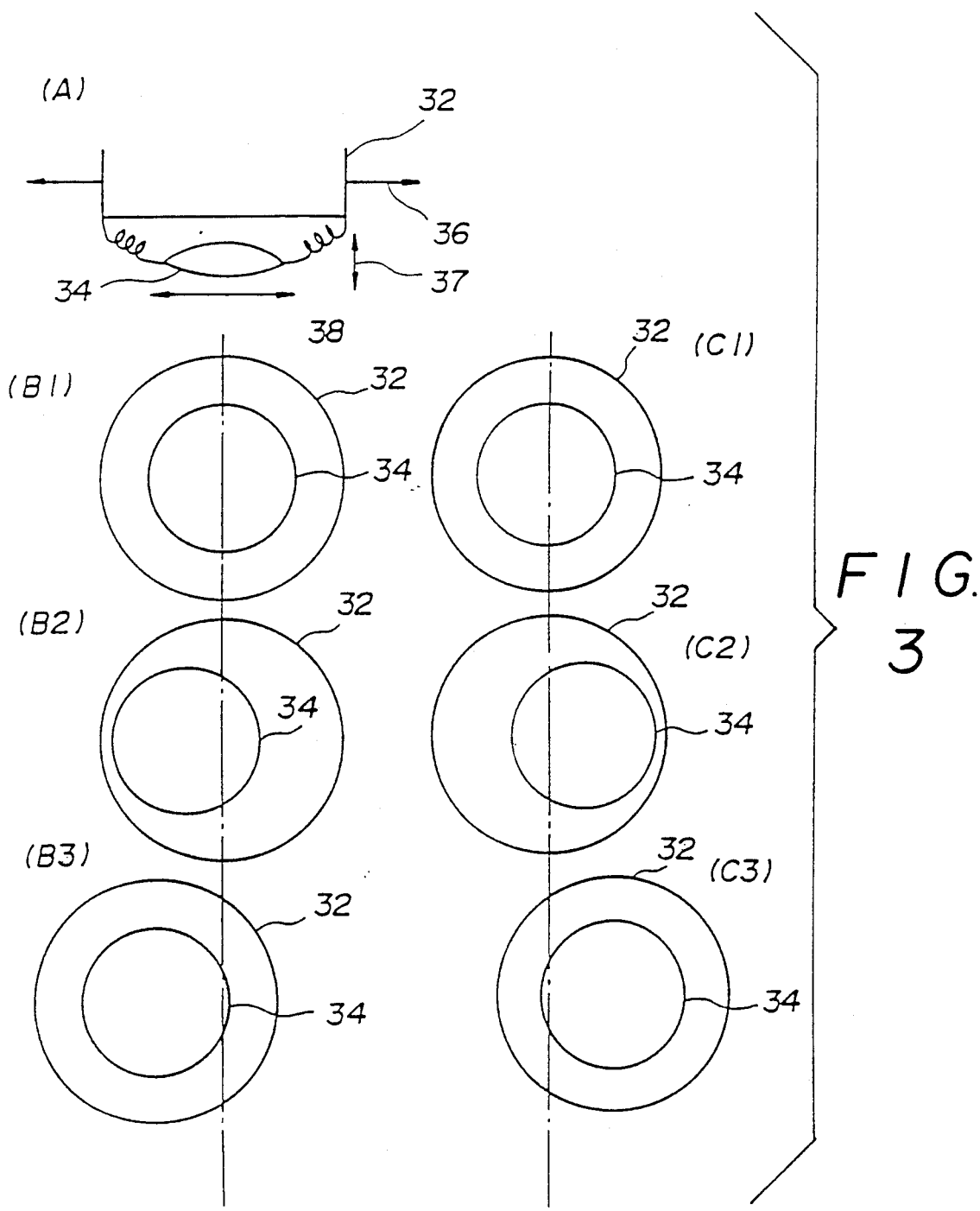
FIG. 3 illustrates the operation of the present invention.
Figure 4:
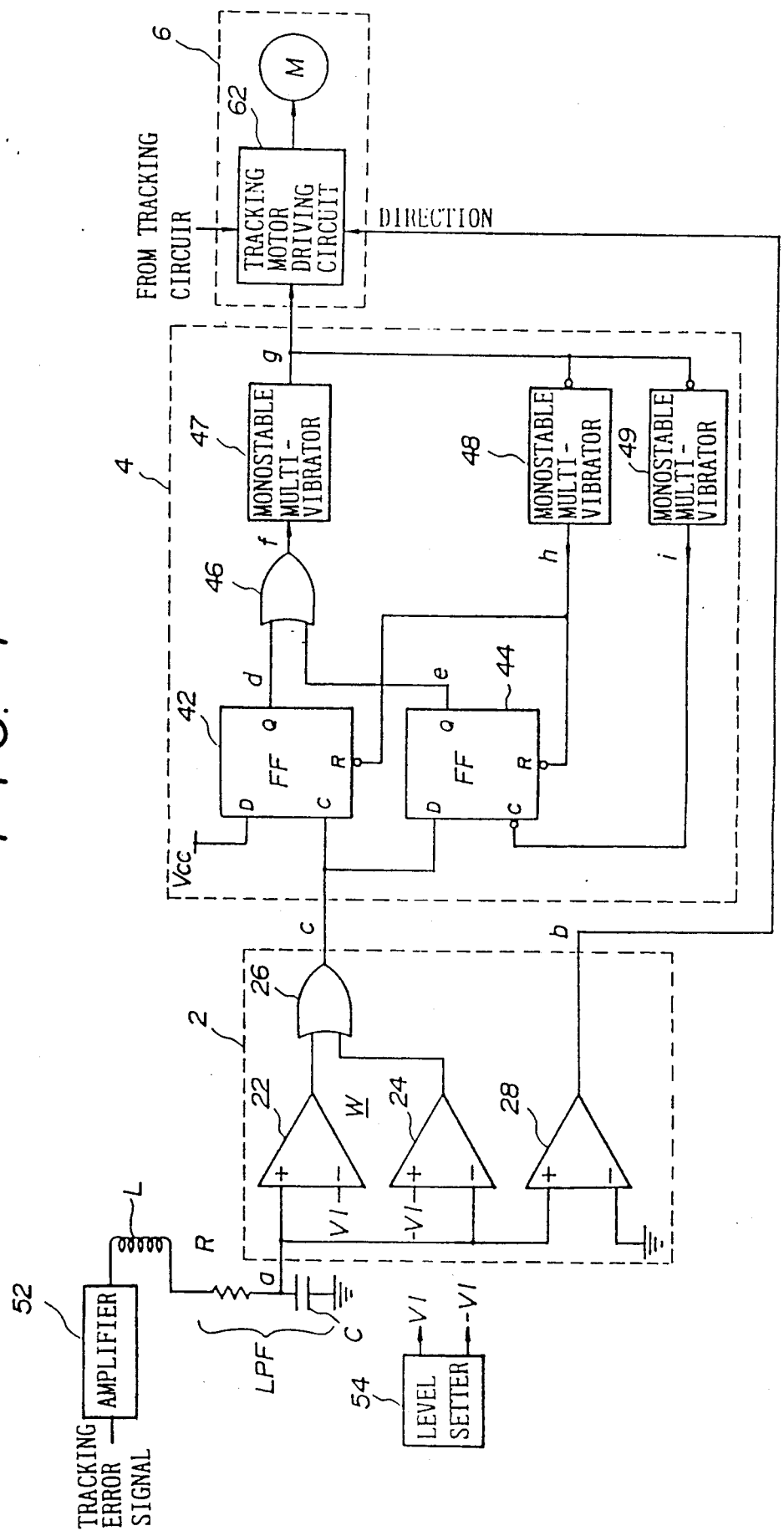
FIG. 4 is a circuit diagram of a tracking device, showing a first embodiment of the present invention.

Referring first to FIG. 4, which is a block diagram of a tracking device for an optical memory card, a first embodiment will be described. The tracking error signal which has been described with reference to FIG. 2 is amplified by an amplifier 52, and this signal is passed through a tracking coil L and a low-pass filter (LPF). A resultant signal is then received by a comparison means 2 as tracking error information a. The low-pass filter is constituted by a resistor R and a capacitor C. It passes only the dc component of the tracking error signal. It may also be arranged such that the tracking error signal is input to the low-pass filter without being passed through the tracking coil L. The tracking coil L is fixed to an objective lens 34 movably held by a retaining portion 32 shown in FIG. 3(A) so as to move, together with a permanent magnet (not shown) fixed to the retaining portion 32, the objective lens 34 in a horizontal direction 38 by virtue of electromagnetic action. Although the objective lens 34 is also moved in a vertical direction 37 for the purpose of focusing control, it has no direct connection with the present invention, and more detailed explanations are therefore omitted. It is also to be noted that the illustration shown in FIG. 2, in which the objective lens 34 is held by coil springs, is only a schematic representation of a movable retaining structure of the objective lens 34.

The comparison means 2 includes a window comparator consisting of comparators 22 and 24 and an OR gate 26, and a comparator 28 for generating a direction signal b. The comparator 22 receives the tracking error information a at its non-inverted input terminal and a voltage V1 delivered from a level setter 54 at its inverted input terminal. The comparator 24 receives at its non-inverted input terminal a voltage $-V1$ delivered from the level setter 54 and at its inverted input terminal the tracking error information a. The OR gate 26 receives both of the outputs of the comparators 22 and 24, and outputs a signal c. The comparator 28 receives at its non-inverted input terminal the tracking error signal a and a grounded level at its non-inverted input terminal, and outputs the direction signal b. In order to prevent the comparators from responding to fine variations in the signals that occur in the vicinity of the comparison level, the comparators may be made hysteretic.

A correcting signal generating mean 4 includes D flip-flops (hereinafter referred to as F/Fs) 42 and 44, an OR gate 46, and monostable multivibrators (hereinafter referred to as on-shot multivibrators) 47, 48 and 49. The F/F 42 receives at its input terminal D a positive voltage $V_{cc}$ and at its clock input terminal C the signal c delivered from the comparison means 2. The F/F 44 receives at its input terminal D the signal c and at its clock input terminal C an output i delivered from the one-shot multivibrator 49. An output h of the one-shot multivibrator 48 is input to reset input terminals R of the F/F 42 and 44. Outputs d and e of the F/F 42 and 44 are both input to the OR gate 46. The one-shot multivibrator 47 receives an output f of the OR gate, and delivers an output g to the one-shot multivibrators 48 and 49.

A retaining portion moving means 7 includes a tracking motor M and a motor driving circuit 62. The driving circuit 62 receives a signal of a tracking circuit (not shown), the output signal g of the correcting signal generating means 4, and the direction signal b of the comparison means 2 to drive the motor M. The motor M employed in this embodiment is a stepping motor. This stepping motor is connected to the retaining portion 32 shown in FIG. 3 through a threading mechanism. The retaining portion is moved to select a desired track on an optical memory card using the signal delivered from the tracking circuit, and the signal delivered from the correcting signal generating means is used to move the retaining portion for tracking correction.

Figure 7A:
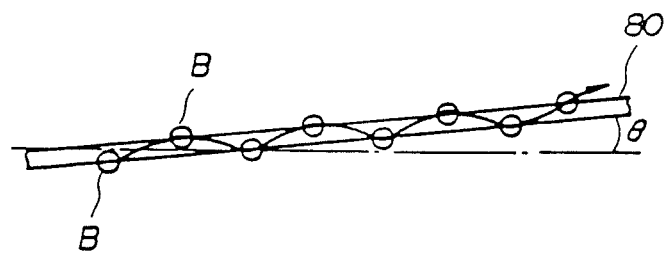
FIG. 7A and 7B respectively illustrate tracking by an optical beam and an example of a tracking error signal.
Figure 7B:
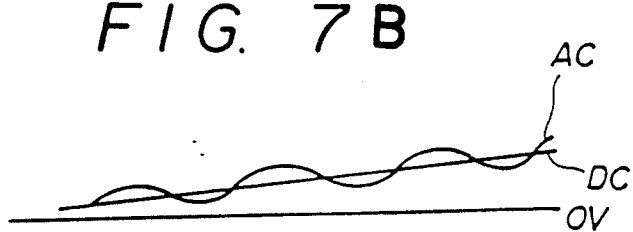

Next, the operation of this tracking device will be described with reference to FIG. 5. In the example shown in FIG. 5, it is assumed that there exists a high degree of skew in the tracking lines. When the deviation occurring during tracking is within the range in which it can be corrected by moving the objective lens, tracking correction is performed and an optical beam B thus follows the corresponding tracking line in a zigzag fashion. The tracking error signal (shown in FIG. 2) used in this tracking correction is an AC signal containing a dc component corresponding to an angle $\theta$ of the skew, as shown in FIG. 7(B). The tracking error information a employed in this embodiment corresponds to this dc component.

The window comparators W in the comparison means 2 compare the tracking error information a with V1 and $-V1$ delivered from the level setter 54 which define a standard range, and delivers a logical high signal when the tracking error information a is outside of the standard range. The comparator 28 compares the tracking error information a with the grounded level, and produces a logical high direction signal b when the level of the tracking error information is higher than the grounded level. In the timing chart of FIG. 5, the direction signal b is shown as a logical high signal.

While the deviation occurring in the tracking is within the range in which it can be corrected by moving the objective lens, the tracking error information a remains within the standard range. However, when the deviation in the tracking exceeds the range in which it can be corrected by moving the objective lens due to a relatively high degree of skew, it cannot be corrected by moving the objective lens, as shown in FIG. 3(B2), and the tracking error information exceeds the standard range. When the tracking error information a exceeds the voltage V1 at time t1 for the above-described reason, as shown in FIG. 5, the OR gate 26 delivers a logical high signal c. The F/F 42 in the correcting signal generating means 4 triggers at the leading edge of the signal c and reads the logical high signal present on the input terminal D. It then delivers a logical high signal d from an output terminal Q. This causes the OR gate 46 to deliver a logical high signal f, which triggers the one-shot multivibrator 47. Upon being triggered, the one-shot multivibrator outputs a pulse having a predetermined duration T1. This causes the motor M to be rotated by a unit angle through the driving circuit 62 so as to move the retaining portion by a unit amount in the direction defined by the direction signal b in which the objective lens can be moved. This enables correction of the deviation occurring in the tracking to be performed again by moving the objective lens, as shown in FIG. 3(B3), and the deviation occurring in the tracking is corrected. Thus, the tracking error information a falls below +V1 at time t2. The one-shot multivibrators 48 and 49 trigger on the trailing edge of the output pulse g of the one-shot multivibrator 47, and upon being triggered the one-shot multivibrator 48 generates a pulse h having a duration T2. The high-to-low transition of the pulse h causes the F/F 42 to reset (to lower the output signal at the terminal Q), which in turn causes the pulses d and f to assume a logic low level. Upon being triggered by the output pulse g, the one-shot multivibrator generates a pulse i having a duration T3 (which is longer than T2), and the high-to-low transition of this pulse i causes the F/F 44 to read the status of the input terminal D (which is the signal c). Since the signal c is at a logic low level at time t3, the status of the output terminal Q remains low.

Further, the tracking error information a exceeds +V1 again at time t4, generating the pulses c, d, f, g, h and i in the same manner as in the above-described first case. However, the second case differs from the first case in that the signal c is at a logic high level at time t5 when the pulse i falls. This causes the F/F 44 to generate a pulse e from the output terminal Q, thereby generating pulses f, g, h and i. The high-to-low transition of the pulse h which occurs at time t6 causes the F/F 44 to reset, thereby lowering the pulses e and f. Thus, in the case where the tracking error information a does not return to within the standard range after one correcting pulse g has been output, the correcting signal generating means 4 automatically generates another correcting pulse g. As stated above, whether the tracking error information a has returned to within the standard range is checked after T3 after the correcting pulse g has fallen. It may also be arranged that the one-shot multivibrators 48 and 49 trigger on the leading edge of the correcting pulse g. In that case, T2 and the T3 are increased by T1.

The one-shot multivibrators employed in this embodiment may be replaced by counters.

In the first embodiment, pulses are generated as the correcting signals, and the motor M is rotated by a unit angle in response to the correcting pulse. However, the motor M is not limited to a stepping motor. Further, the correcting signal may remain high until the tracking error information has returned to within the standard range. A second embodiment in which these factors are taken into consideration will be described below with reference to FIGS. 8 and 9.

This embodiment employs a dc motor 92 as the tracking motor in the retaining portion moving means 6 and a dc motor driving circuit 91 as the tracking motor driving circuit. These changes cause changes in the structures of the comparison means 2 and the correcting signal generating means 4. In order to allow the comparison means 2 to compare the tracking error information with a single level, the low-pass filter located prior to the comparison means 2 is replaced by an inverting low-pass filter 84 and a non-inverting low-pass filter 85. The comparison means 2 includes comparators 86 and 87 which respectively receive outputs a and a' of the low-pass filters 84 and 85 at their non-inverted input terminals. A comparison level +V1 is applied to the inverted input terminals of the comparators 84 and 85 from a level setter 93. If the comparison levels ±V1 are utilized as in the first embodiment shown in FIG. 4, only a single low-pass filter is required. The correcting signal generating means 4 includes a level converter 88 which receives an output b of the comparator 86, a polarity inverting level converter 89 which receives an output b' of the comparator 87, and an adder 90 which receives outputs c and c' of the converters 86 and 87.

Figure 8:
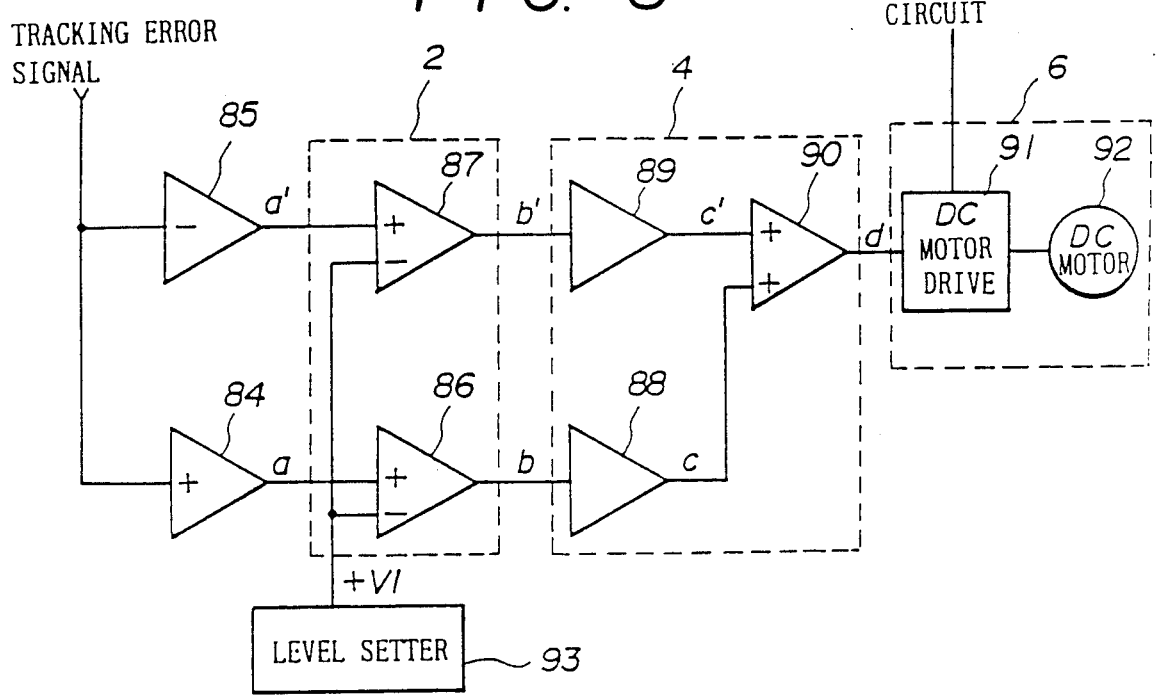
FIG. 8 is a circuit diagram of a tracking device, showing another embodiment of the present invention.

The operation of the tracking device shown in FIG. 8 will be described now with reference to FIG. 9. It is assumed again that there exists a relatively high degree of skew in the tracking lines in this embodiment. The timings of the operation which correspond to a positive skew are shown in FIG. 9(A), and the timings corresponding to a negative skew are shown in FIG. 9(B).

The dc component of the tracking error signal (shown in FIG. 2) is read as tracking error information a or a' by the low-pass filter 84 or 85. When the dc component is a positive component, the error information a is positive. On the other hand, when the dc component is negative, the error information a' is positive. The error information a or a' is compared with the comparison level +V by the comparator 86 or 87. Assuming now that the positive dc component gradually increases and that the error information a thereby exceeds +V at time t1, as shown in FIG. 9(A), the signal b assumes the high level. This logical high signal b is converted by the level converter 88 to a signal having a level suitable for driving the motor, and this signal is supplied to the motor driving circuit 91 through the adder 90. As a result, the retaining portion is moved in the direction in which the deviation occurring during tracking can be corrected, and the error information a thereby falls and returns to within the standard range at time t2. Thus, the signal b assumes a logical low level again at time t2, and the drive of the dc motor 92 is stopped.

Similarly, when the negative dc component (shown by the broken line) gradually increases and the inverted level (shown by the solid line) thereof exceeds the error information a' at time t1, as shown in FIG. 9(B), the signal b' assumes a logical high level. This signal b' is converted by the level converter 89 to a signal having a level suitable for driving the motor, and a resultant signal is supplied to the motor driving circuit 91 through the adder 90. As a result, the retaining portion is moved in the direction in which the deviation occurring during tracking can be corrected, and the error information a' falls and returns to within the standard range at time t2. Thus, the signal b' assumes the logical low level again at t2, and the drive of the dc motor 92 is stopped.

The retaining portion of the objective lens is thus moved to enlarge the range in which the deviation occurring during tracking can be corrected by moving the objective lens.

What is claimed is:

1. A tracking device for an optical memory card which includes a mobile objective lens in an optical system which performs tracking correction by moving a mobile objective lens of an optical system in the transverse direction of tracks in accordance with the tracking error of said optical system relative to said optical memory card, comprising:

comparison means for determining whether or not tracking error information is within a predetermined standard range and for generating a direction signal that represents the direction for correction;

correcting signal generating means having first and second flipflops, an OR gate and first, second and third monostable multivibrators for generating a correcting signal when the result of the determination conducted by said comparison means is negative, wherein said first flipflop receives a determined voltage and the signal delivered from said comparison means, said second flipflop receives the signal delivered from said comparison means and the output signal delivered from said first monostable multivibrator, said first and second flipflops receive the output signal delivered from said second monostable multivibrator, said OR gate receives the output signal delivered from said first and second flipflops, and said first and second monostable multivibrator receives the output signal delivered from said third monostable multivibrator; and retaining portion moving means for moving a retaining portion of said objective lens in the direction indicated by said direction signal in response to said correcting signal delivered from said generating means;

whereby the range in which tracking correction can be performed is enlarged.

2. A tracking device for an optical card according to claim 1, wherein said retaining portion moving means includes a tracking motor driven by the application of a correcting signal in the form of a pulse; and a tracking motor driving circuit for driving said motor in response to said correcting pulse and said direction signal.

3. A tracking device for an optical card according to claim 1, wherein said retaining portion of said objective lens is moved together with a photodetector.

* * * * *